(12) United States Patent
Akande

(10) Patent No.: US 11,625,804 B2
(45) Date of Patent: Apr. 11, 2023

(54) SYSTEM AND METHOD FOR RIDESHARING

(71) Applicant: Kolapo Malik Akande, Frisco, TX (US)

(72) Inventor: Kolapo Malik Akande, Frisco, TX (US)

( * ) Notice: Subject to any disclaimer, the term of this patent is extended or adjusted under 35 U.S.C. 154(b) by 100 days.

(21) Appl. No.: 17/300,265

(22) Filed: May 5, 2021

(65) Prior Publication Data

US 2021/0264554 A1 Aug. 26, 2021

Related U.S. Application Data

(63) Continuation of application No. 15/594,575, filed on May 13, 2017, now Pat. No. 11,030,710.

(60) Provisional application No. 62/476,457, filed on Mar. 24, 2017.

(51) Int. Cl.
   *G06Q 50/30* (2012.01)
   *G06Q 10/10* (2012.01)
   *G06Q 10/1093* (2023.01)

(52) U.S. Cl.
   CPC ......... *G06Q 50/30* (2013.01); *G06Q 10/1093* (2013.01)

(58) Field of Classification Search
   CPC .............................. G06Q 40/00; G06Q 50/30
   USPC ........................................................ 705/35
   See application file for complete search history.

(56) References Cited

U.S. PATENT DOCUMENTS

| | | | |
|---|---|---|---|
| 10,248,913 B1* | 4/2019 | Gururajan | G06Q 50/30 |
| 2003/0182183 A1* | 9/2003 | Pribe | G08G 1/22 705/13 |
| 2003/0233292 A1* | 12/2003 | Richey | G06Q 40/12 705/28 |
| 2008/0059351 A1* | 3/2008 | Richey | G06Q 20/20 705/35 |
| 2009/0234658 A1* | 9/2009 | Greenwell | G06Q 30/02 705/13 |
| 2009/0248294 A1* | 10/2009 | Machino | G01C 21/36 701/415 |
| 2009/0326804 A1* | 12/2009 | Machino | G01C 21/3492 701/533 |
| 2013/0073321 A1* | 3/2013 | Hofmann | G06Q 10/10 705/4 |
| 2013/0166325 A1* | 6/2013 | Ganapathy | G06Q 40/08 705/4 |
| 2016/0187150 A1* | 6/2016 | Sherman | G06Q 10/063114 705/7.15 |
| 2016/0320195 A1* | 11/2016 | Liu | G01C 21/3438 |
| 2017/0200321 A1* | 7/2017 | Hummel | G06Q 10/02 |
| 2018/0267526 A1* | 9/2018 | Makke | B60W 30/00 |

(Continued)

Primary Examiner — Kirsten S Apple

(57) ABSTRACT

A computing system including a processor may receive, from a network device, a request for a ride at a scheduled time. The computing system may start to look for a candidate ride, to serve the received request, at a predetermined time prior to the scheduled time. The computing system may book the candidate ride to serve the received request upon determining that the candidate ride can serve the received request. The computing system may determine occurrence of a potential failure associated with the candidate ride serving the received request. The computing system may book a replacement ride to serve the received request upon determining that the replacement ride can serve the received request. Various other aspects are disclosed.

15 Claims, 12 Drawing Sheets

(56) References Cited

U.S. PATENT DOCUMENTS

2019/0114732 A1\* 4/2019 Tanabe ........... G06Q 10/063116
2019/0130516 A1\* 5/2019 Matsushima .. G06Q 10/063112
2019/0295142 A1\* 9/2019 Paulucci ................ G06Q 50/30

\* cited by examiner

FIG. 7

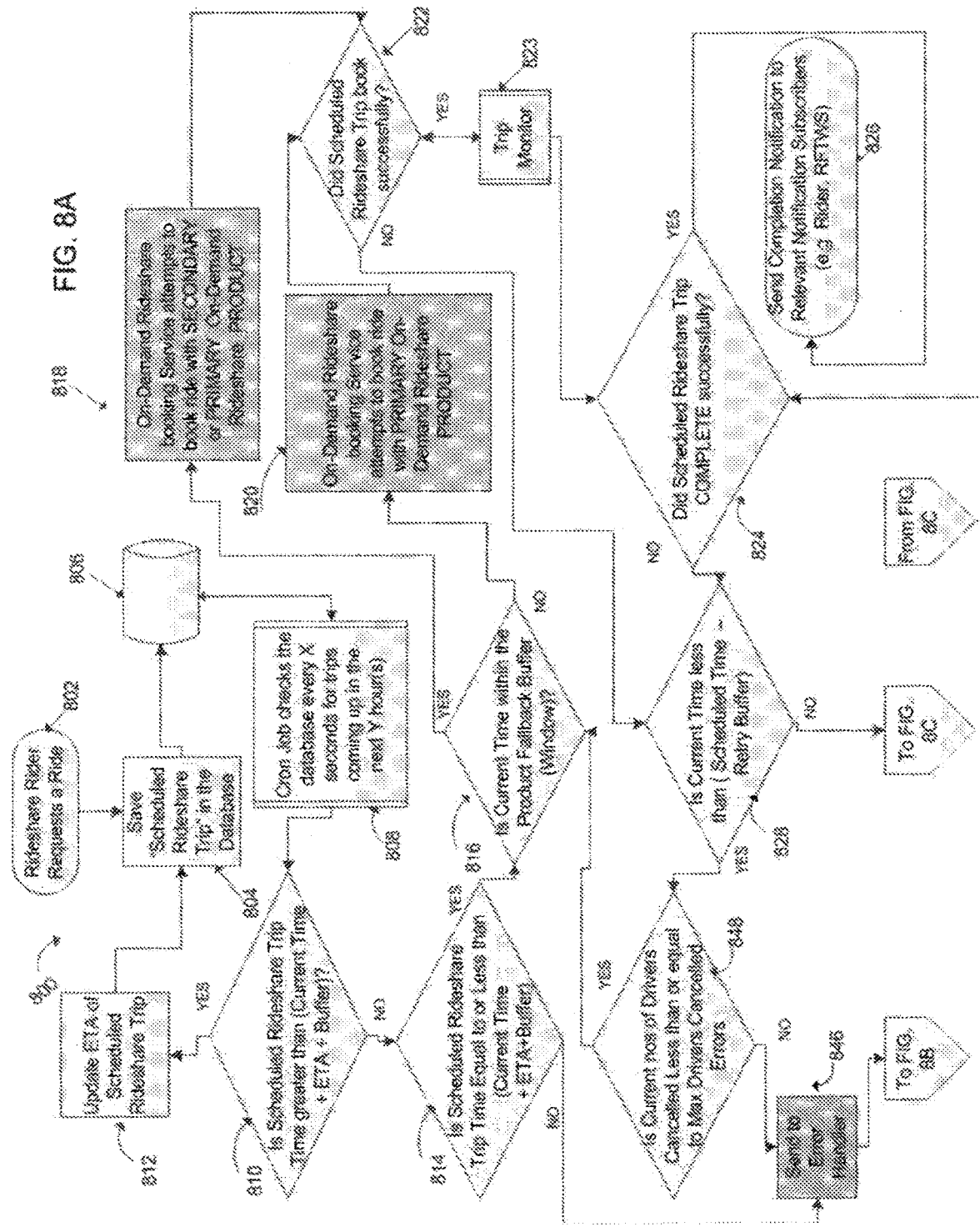

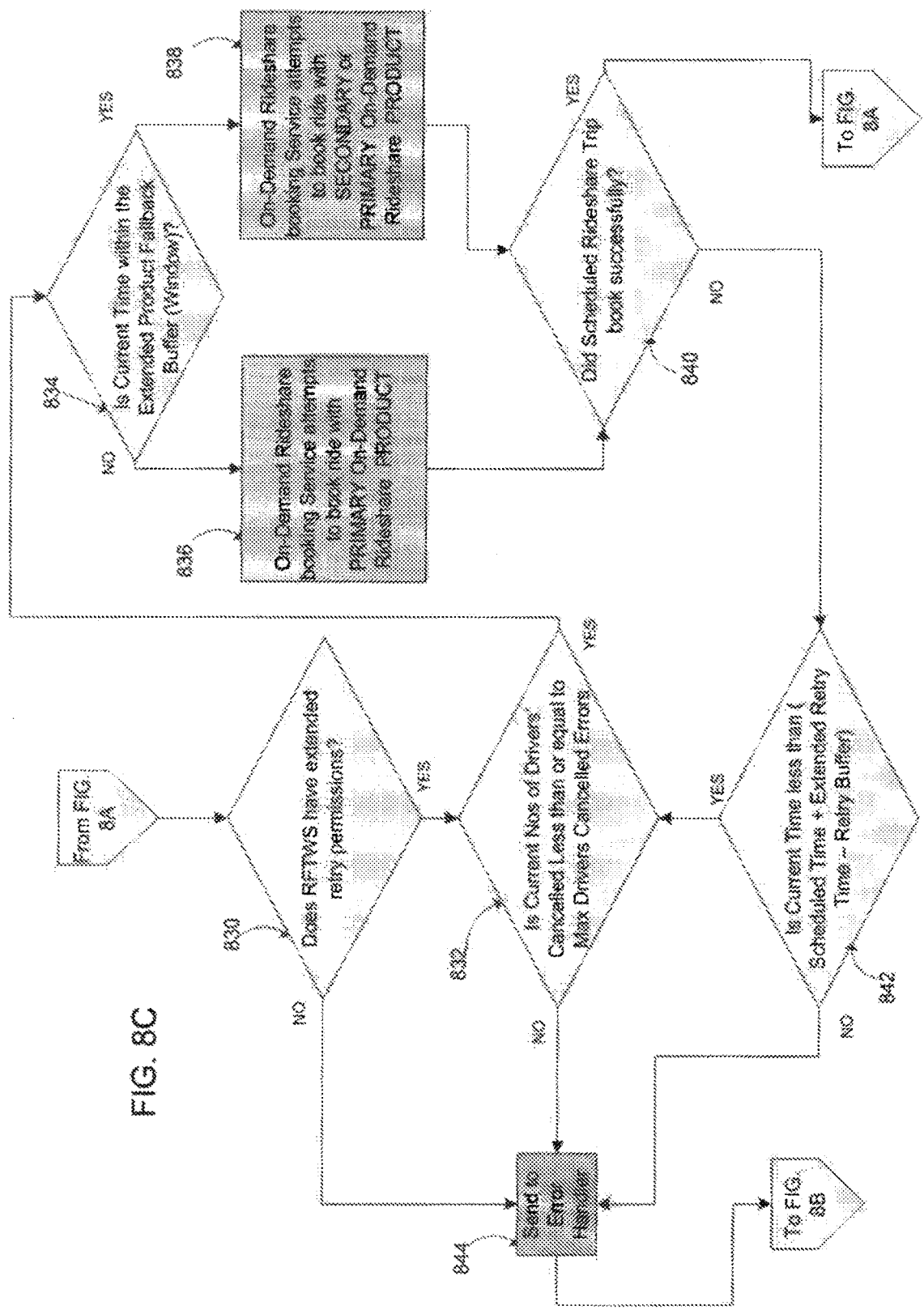

SYSTEM AND METHOD FOR RIDESHARING

CROSS-REFERENCE TO RELATED APPLICATIONS

The present Utility patent application is a continuation application of, and claims priority to, now allowed U.S. application Ser. No. 15/594,575, which claims priority benefit of the U.S. provisional application for patent Ser. No. 62/476,457 entitled "A RIDESHARE SCHEDULING SYSTEM" filed on 24 Mar. 2017 under 35 U.S.C. 119(e). The contents of U.S. application Ser. No. 15/594,575 and related provisional application 62/476,457 are incorporated herein by reference in their entireties for all purposes to the extent that such subject matter is not inconsistent herewith or limiting hereof.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to ridesharing in a transportation system. More particularly, certain embodiments of the invention relate to improving a rideshare scheduling system.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. In recent years ridesharing of transportation facilities, particularly, car/bike pooling may have greatly reduced the need for owning your own vehicle or waiting endlessly for public transport.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that though a variety of ridesharing facilities may be available, at times failures may be expected due to driver cancellation, lack of driver availability, prohibitive charges for the ride, and inconvenience in pick-up and drop-off point leading to cancellation of ride, among others. It is believed that rideshares that are typically available may have limited facilities, for example, (a) scheduling rideshare rides using an underlying rideshare service, but without any re-try mechanism(s) for ride failures; (b) scheduling rideshare rides using an underlying rideshare service, with re-try mechanisms available only before a ride is booked for ride failures; (c) scheduling rideshare rides using an underlying rideshare service, with re-try mechanisms before and after the ride is booked, but for which the ride has not arrived at the rider's pickup address; etc.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7 is a graphical illustration of an exemplary process for ridesharing in transportation, in accordance with an embodiment of the present invention;

FIGS. 8A-8C illustrate a flow chart depicting an exemplary process for ridesharing in transportation, in accordance with an embodiment of the present invention system.

DETAILED DESCRIPTION OF SOME EMBODIMENTS

Figure 1:
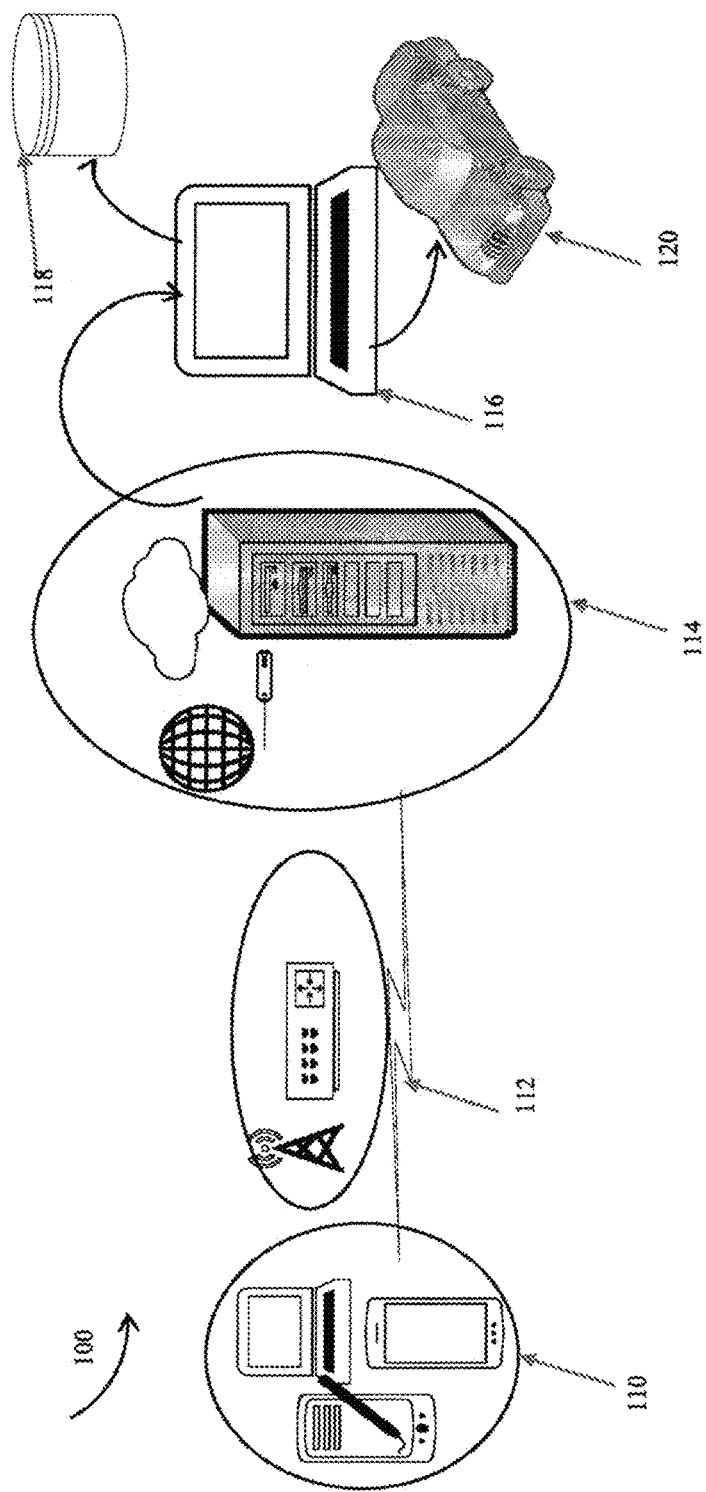
FIG. 1 illustrates an exemplary system for ridesharing in transportation, in accordance with an embodiment of the present invention.

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognized in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claims of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of Claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server, a client, an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

As used herein, the phrase "Scheduling Service Reliability" may refer to how likely it is that a rideshare rider may get his/her scheduled rideshare ride/trip. The reliability of getting a ride may typically be based on certain error scenarios, including but not limited to, "No Driver Available", "No Rideshare Product available", "Driver Cancelled", "Server Error", "Payment Error", "Account Error", and "Unknown Error". Accordingly, in some instances it may be possible for a scheduled ride to go unfulfilled. In one exemplary embodiment, the Scheduling Service Reliability (R) may be calculated using the formula R=(Number of Successfully Requested Rides/Number of Rides Scheduled by the Rideshare Scheduling Service)×100 percent.

As used herein, the phrase "On-Demand Rides" may refer to rides requested at a specific instant i.e, for immediate use when demanded for and not for later, through an On-Demand Rideshare Service (internal or external to the Rideshare Fault Tolerant Watchdog System—RFTWS).

As used herein, the phrase "On-Demand Rideshare Services" may refer to any services that are available for public or private use for requesting On-Demand rides. For example, the on-demand rideshare services may include but are not limited to rideshare service providers like Uber®, Lyft®, and other like providers.

As used herein, the phrase "Rideshare Umbrella Service" may refer to any "On-Demand Rideshare Services" or Ridesharing application program interfaces (APIs) that may be available for public or private use for scheduling rides. For example, the ride share umbrella service may include but are not limited to rideshare service providers like Uber®, Lyft®, and other like providers.

As used herein, the phrase "On-Demand Rideshare Products" may refer to any products or services offered by a "Rideshare Umbrella Service", "On-Demand Ridesharing Service" or "Ridesharing API". For example, an On-Demand Ridesharing Service might offer a service "A" that includes various make and models of rickshaw vehicles; a service "B" that includes various make and models of mid-size vehicles; a service "C" that includes various make and models of full-size vehicles; a service "D" that includes various make and models of hatchback vehicles; a service "E" that includes various make and models of luxury vehicles, and other like services for Rideshare Riders As used herein, the phrase "Scheduled Rideshare Trip" may refer to a trip scheduled by a "Rideshare Rider" or a service for a later time. For example, a Rider "Thomas" may need to go to the airport in 2 weeks, at 5 am on Monday the $26^{th}$ of September 2016 (Time A), if today's date may be Saturday Aug. 27, 2016 (Time B), a rideshare trip planned for "Time A" may be referred to as a scheduled rideshare trip.

As used herein, the phrase "Scheduled Rideshare Trip Time" may refer to a specific time and date a "Scheduled Rideshare Trip" may be scheduled to arrive at a rideshare rider's scheduled pickup location.

As used herein, the phrase "Scheduled Pickup Location" may refer to a location that a rideshare vehicle and driver are supposed to pick up a rideshare rider who has scheduled a rideshare.

As used herein, the phrase "Scheduled Destination Location" may refer to the location that a rideshare vehicle and driver are supposed to drop off their Rideshare rider, after pickup.

As used herein, the phrase "Ride Request Retries" may refer to an "On demand" rideshare ride request made after a failure (specified/unspecified) of either a scheduled ride share or on demand ride share.

As used herein, the phrase "Rideshare Rider" may refer to a person, a good, a commodity, a device (any animate/inanimate object) that may need to be picked up at a "Scheduled Pickup Location" for drop off at a "Scheduled Destination Location".

As used herein, the phrase "Rideshare Driver" may refer to a person or driverless vehicle that may pick up a "Rideshare Rider" at a "Scheduled Pickup Location" for drop off at a "Scheduled Destination Location".

As used herein, the phrase "Fault Tolerant Capabilities" may refer to any property of the Rideshare Fault Tolerant Watchdog System (RFTWS) to continue operating in an attempt to request a rideshare ride in the event of a failure of some or all of its components (internal or external to the RFTWS).

As used herein, the phrase "No Driver Available" may refers to a scenario where a "Rideshare Driver" may not be available to pick up the "Rideshare Rider" at the specified "Scheduled Rideshare Trip Time" or pickup time.

As used herein, the phrase "Prices Outside Acceptable Threshold" may refer to a scenario where the price of the rideshare trip may be more than what may be considered normal as specified by either the "Rideshare Rider" or the RFTWS.

As used herein, the phrase "No Rideshare Product available" may refer to a scenario where "Rideshare Drivers" may be available, but the system or "Rideshare Rider" selected or desired "On-Demand Rideshare Products" may not be available.

As used herein, the phrase "Driver Cancelled" may refer to a scenario where the "Rideshare Driver" may cancel a rideshare request, even after it is successfully called by the RFTWS system.

As used herein, the phrase "Server Error" may refer to a scenario where any of the components (internal or external) that the RFTWS depends on may fail.

As used herein, the phrase "Payment Error" may refer to a scenario where the "On-Demand Rideshare Service" or Rideshare API being used may have no way to prove that the requested rideshare ride will be paid for if provisioned successfully.

As used herein, the phrase "Account Error" may refer to a scenario where the "On-Demand Rideshare Service" or Rideshare API being used may have no way to prove the authenticity of the person/user/rider/system requesting on-demand rideshare service.

As used herein, the phrase "Unknown Error" may refer to any error that prevents a rideshare ride from being provisioned/requested successfully by the RFTWS.

Referring to FIG. 1 is illustrated an exemplary system for ridesharing in transportation, in accordance with an embodiment of the present invention. The ridesharing in transportation system 100 comprises at least a computer system 110, at least a routing system 112, at least a server 114, at least a RFTWS 116, at least a database 118 and at least a rideshare transportation 120. In one embodiment, the computer system 110 may include a display interface 122 that may display a presentation layer (not shown in figure) for a user to book a ride share, wherein the presentation layer may include a graphical user interface, status information for a rideshare transportation, selection information for a ride share transportation among others. A computer system 110 may be virtually any device or devices capable of displaying a presentation layer and allowing the user to book a ride share transportation, as well as send the booking information to a server. The server 114 may be any computing platform that executes computer software and/or code from a non-transitory computer readable medium. Server 114 may access a RFTWS 116 containing rideshare failure resolutions. RFTWS 116 may access a rideshare transportation device/driver to schedule the ride share 120. RFTWS 116 may also access a database 118. Information saved in the database 118 includes, but is not limited to Trip information (Start Latitude, Start Longitude, Start Address, End Latitude, End Longitude, End Address, On-Demand Ridesharing Service, Scheduled Time, Ride Status, and Driver Information) and User Information (Name, Email and Picture). In some embodiments, system 100 may comprise two or more computer systems 110, two or more servers 114 with databases 118, two or more rideshare transportation 120.

Figure 2:
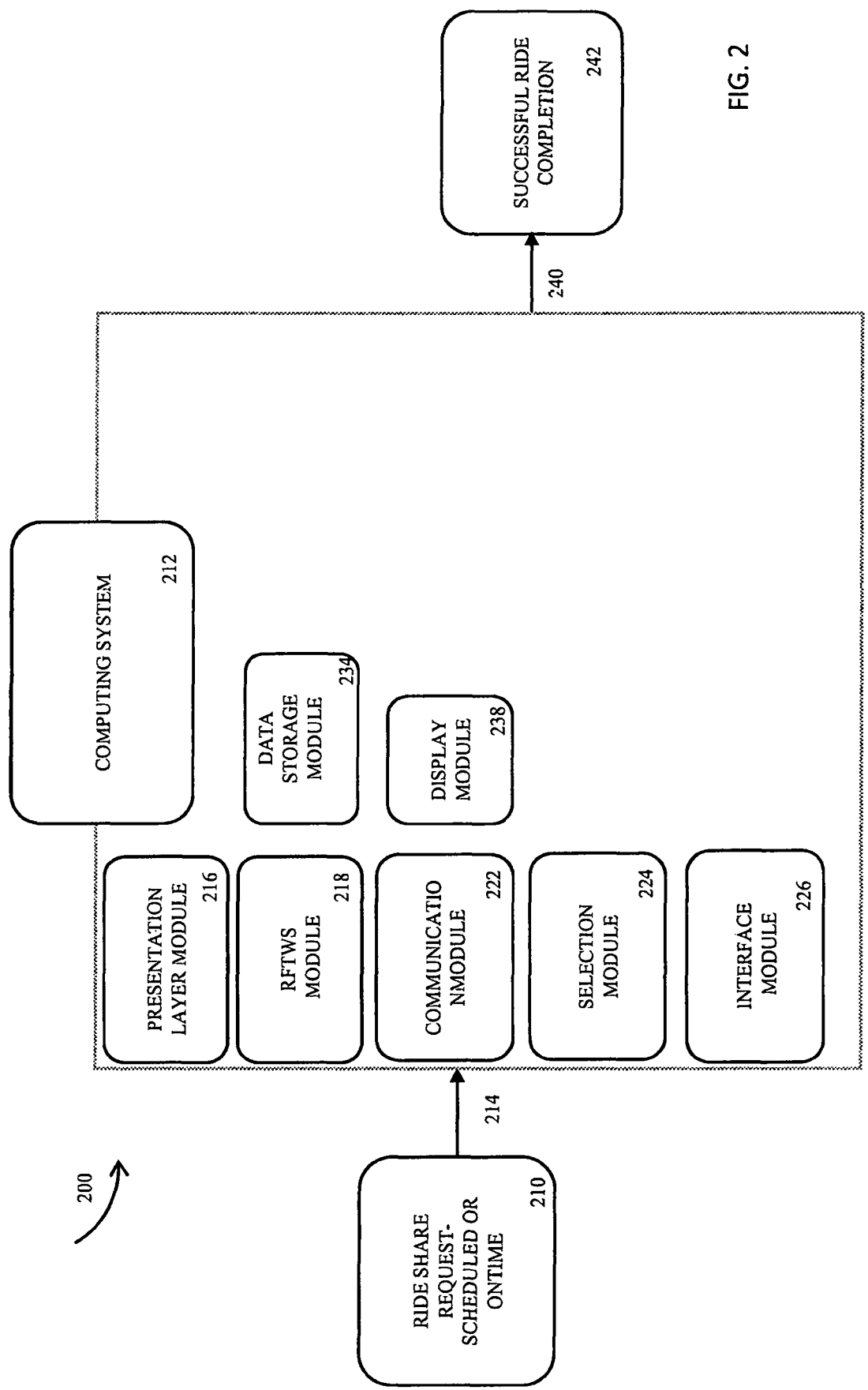
FIG. 2 illustrates an architecture of an exemplary system for ridesharing in transportation, in accordance with an embodiment of the present invention.

Referring to FIG. 2 is illustrated an architecture of an exemplary system for ridesharing in transportation, in accordance with an embodiment of the present invention. A ridesharing in transportation architecture 200 may comprise a computing system 212. The computing system may include a presentation layer module 216, a RFTWS module 218, a communication module 222, a selection module 224, and an interface module 226, a data storage module 228 (not shown in figure), and a display module 238. Presentation layer module 216 may have a means presenting a designated software program for booking a request with a rideshare transportation, such as, without limitation, sensors and/or a processing unit, and presenting a user interface on a display module 238. RFTWS module 218 may have a means of processing the booking request made with a rideshare transportation, without limitation, a processing unit, a computer, or a server to execute computer code and/or algorithms from a non-transitory computer readable medium for image recognition. Communication module 222 may have a processing means such as, without limitation, a processing unit, a computer, or a server 240 to execute computer code and/or algorithms from a non-transitory computer readable medium for communicating a booking request from a presentation layer module to a webserver, from a webserver to a RFTWS, from the RFTWS to the rideshare device/driver, and from RFTWS to the database module. An interface module 226 may have a means to display rideshare booking information, such as, without limitation, a screen on a smartphone, to a user. The data storage module 228 may include a database as described herein above, wherein the database may include, means for storing data on the bookings, the successful rides, the failed rides, status of rides, selection of rides, and the like. The databases may include, but not be limited to, a plurality of data servers, and a memory card. The display module 230 may have a means to display the booking status, ride completion information, payment information, etc. . . . such as, without limitation, a screen on a computing system 110, to 232, a rideshare user, (not shown in figure), on completion of a successful ride in 234 or on making 214 a ride share request 210.

It may be appreciated by a person with ordinary skill in the art, in light of and in accordance with the teachings of the present invention, that one or more modules may be embodied in a single device. In an alternative embodiment of the present invention, all modules except the data storage module 228 may be embodied in a personal computer or laptop device. The personal computer or laptop device would be capable of enabling a user to place a ride share request using a designated software program (RFTWS) present in the personal computer or laptop device.

It may be appreciated by a person with ordinary skill in the art, in light of and in accordance with the teachings of the present invention, that there may be a plurality of the same modules in the ridesharing in transportation architecture 200. A plurality of modules such as, without limitation, a presentation layer module 216, a RFTWS module 218, a communication module 222, a selection module 224, and an interface module 226, a data storage module 228 (not shown in figure), and a display module 238 may be present in the ridesharing in transportation architecture 200. The plurality of similar modules may work in parallel or independently to improve the throughput and/or speed of ridesharing in transportation architecture 200. In an alternative embodiment of the present invention, a plurality of capture, processing, formatting, and organizing, generation, display, interface, and storage modules may be connected to a ridesharing in transportation system via wired and wireless connections to access resources from different wired and wireless networks. In still another alternative embodiment of the present invention, a plurality of similar modules may form a secondary ridesharing in transportation system capable of seamlessly substituting an errant module.

It may be appreciated by a person with ordinary skill in the art, in light of and in accordance with the teachings of the present invention, that one or more modules may transmit capture information to a tech support server that is on an accessible network or over the internet. In an alternative embodiment of the present invention, additional captured information may be sent to a server to alleviate processing load on a ridesharing in transportation system, for example, if multiple instances of the RFTWS are being run simultaneously.

It may be appreciated by a person with ordinary skill in the art, in light of and in accordance with the teachings of the present invention, that any module in the ridesharing in transportation architecture 200 may perform data manipulation. Data manipulation such as, but not limited to, compression, encryption, formatting. In an alternative embodiment of the present invention, any module sending data may first compress the data prior to data transmission.

Figure 3:
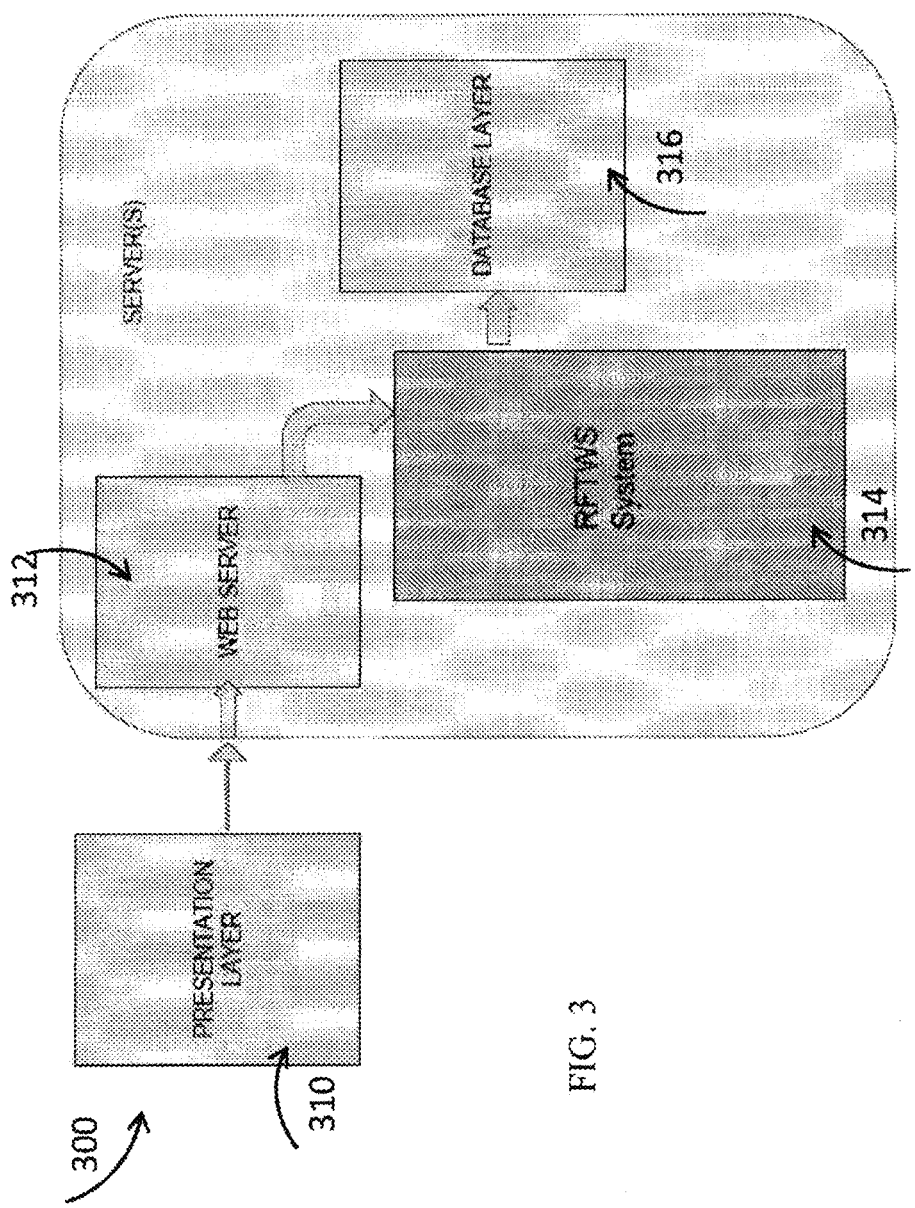
FIG. 3 illustrates an exemplary flow of an exemplary system for ridesharing in transportation, in accordance with an embodiment of the present invention.

Referring to FIG. 3 is illustrated an exemplary flow of an exemplary system for ridesharing in transportation, in accordance with an embodiment of the present invention. FIG. 3 is a diagram showing a sample implementation 300 of the RFTWS. As shown in FIG. 3, the system 300 includes a presentation layer 310. The presentation layer 310 may include any user interface selected from, but not limited to, a mobile application, a website, or another system application that is capable of scheduling a rideshare in transportation. The user may employ the computer system 110 shown in FIG. 1 to launch and use the presentation layer 310. In various embodiments, the computer system may include a laptop, a smart phone, a personal computer, a tablet, or any other like device that may be capable of hosting the presentation layer and allow a rideshare user to make the request to and receive the notifications from the RFTWS.

In one embodiment, a request may be made by the user using the presentation layer 310 to a web server 312. In one embodiment, multiple users may use the presentation layer 310 from multiple devices to make a request to the web server 312. In another embodiment, a single user may use the presentation layer 310 in multiple instances to make requests to the web server 312. Accordingly, the web server 312 in the sample implementation shown in FIG. 3, may manage requests for scheduling from multiple instances of the presentation layer 312. The web server may also interact with the RFTWS system 314 for passing requests for monitoring scheduled rideshare trips and on-demand rideshare booking (if within a configurable window before the scheduled time), or/and for onward passing on to a database/storage implementation system 316.

In one embodiment, the sample implementation in FIG. 3 may involve all the components on the same server. In one embodiment, the server may include, but is not limited to, a web server, the RFTWS, and the database. In another embodiment, sample implementation in FIG. 3 may involve all the components on separate servers. In one embodiment, the system may include additional components that perform ancillary or central services, for example, notification module(s), data storage module(s), communication module(s), batched jobs module(s), payment processor module(s) etc—not shown in diagram). In an exemplary embodiment, all components of the sample implementation shown in FIG. 3 may be on the same server.

Figure 4:
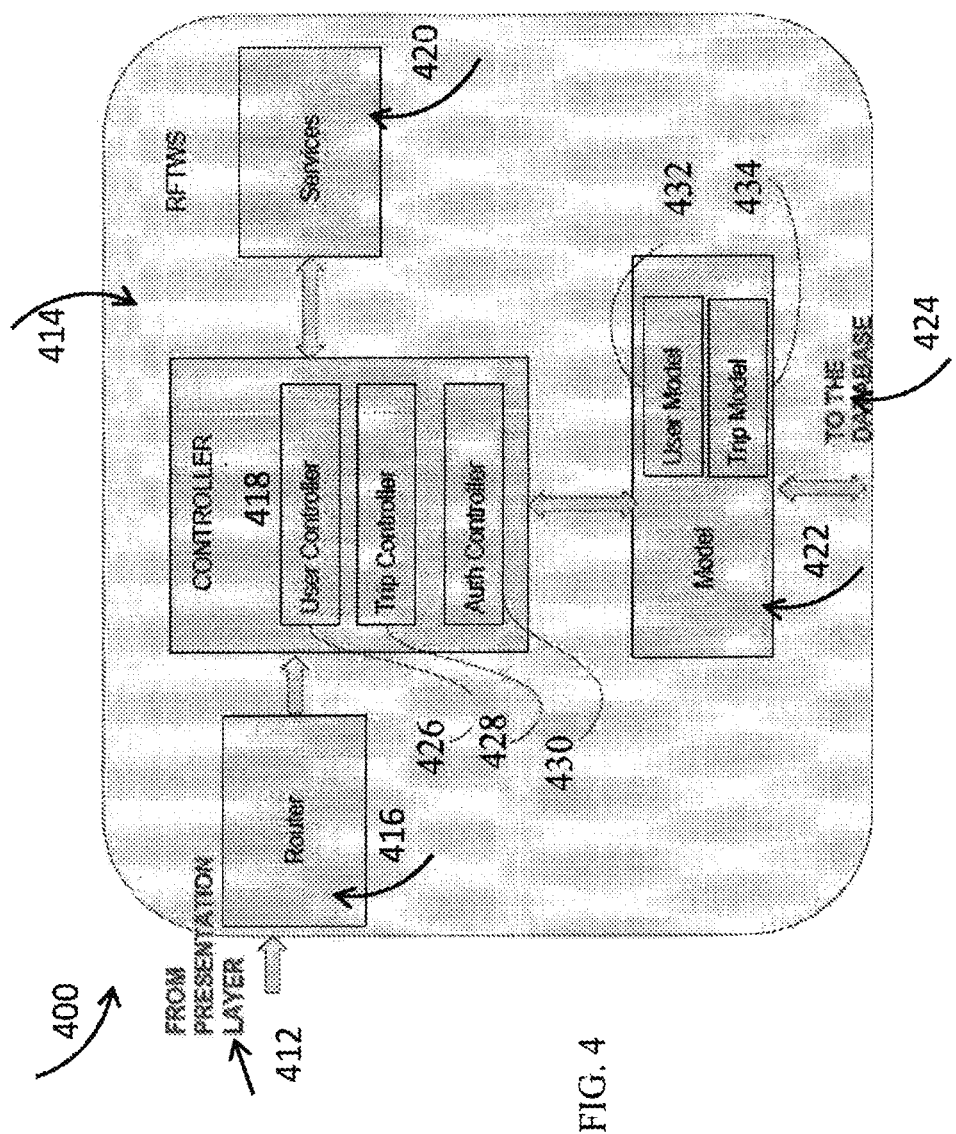
FIG. 4 illustrates an exemplary flow of an exemplary system for ridesharing in transportation, in accordance with an embodiment of the present invention.
Figure 5:
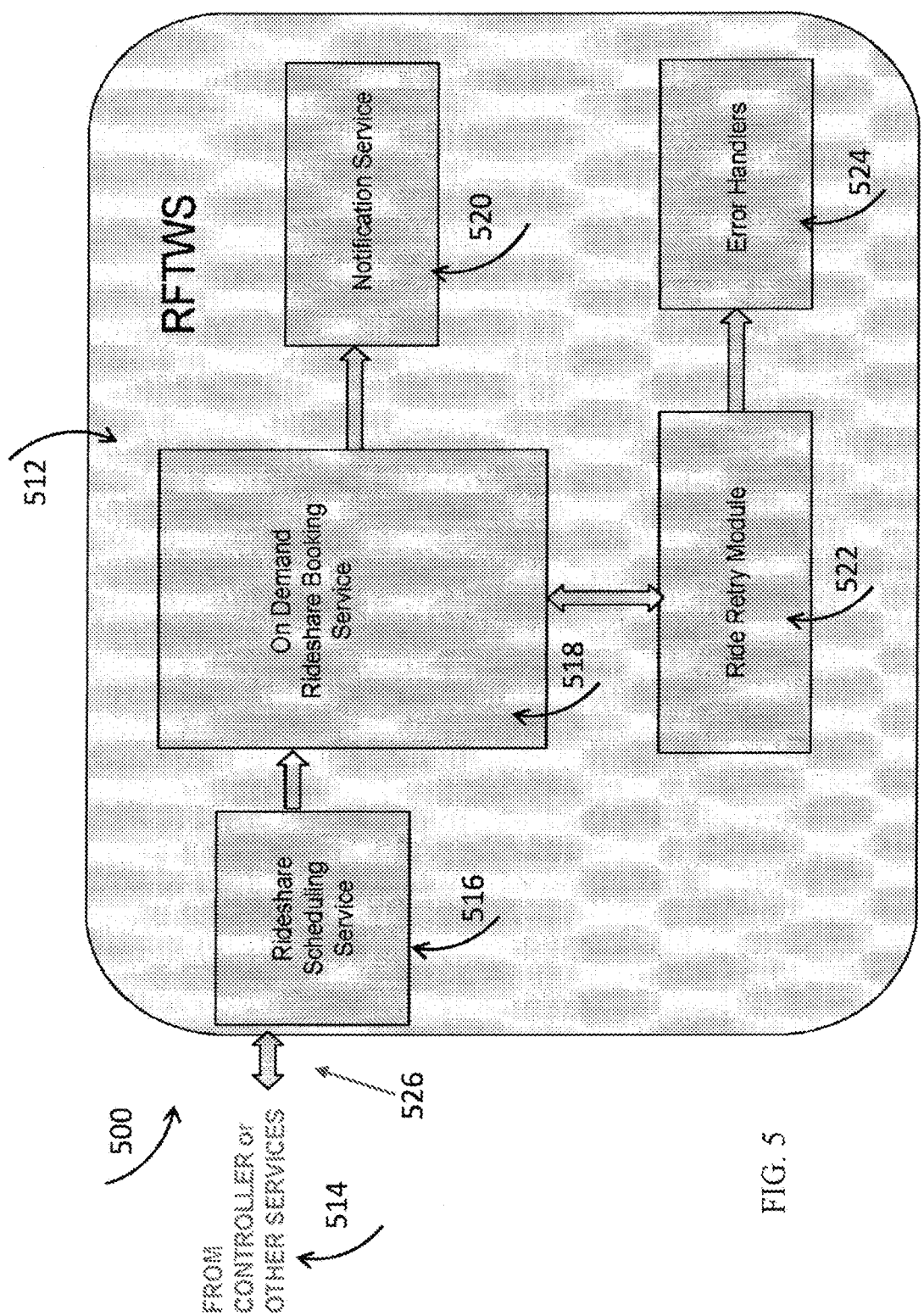
FIG. 5 illustrates an exemplary flow of an exemplary process for ridesharing in transportation, in accordance with an embodiment of the present invention.

Referring to FIG. 4 is illustrated an exemplary flow of an exemplary system for ridesharing in transportation, in accordance with an embodiment of the present invention. FIG. 4 is a diagram showing a more detailed view 400 of a sample RFTWS. In the exemplary embodiment, shown in FIG. 4 the RFTWS 414 may contain a router module 416 which may communicate service request made by a user using the presentation layer 412 to various controllers 418. In various embodiments, the controller may include but is not limited to a user controller 426, a trip controller 428, an authorization controller 430. Depending on a specific rideshare service requested and options desired by the calling system (and/or rideshare user) a service 420 may be called or a request to the database/storage system 424 may be made. This means that an On-Demand ride request may be made 420 or a Scheduled Rideshare Trip is saved in the database 424. In the exemplary embodiment, illustrated in FIG. 4, requests to the database may be made by leveraging an application programming interface (model) implementation 422. In one embodiment, a user model 432 included in the application programming interface implementation 422 may abstract a user table. In one embodiment, a rideshare rider information may be stored in the user table 432. In one embodiment, a trip model 434 included in the application programming interface implementation 422 may abstract a trip table. In one embodiment, a scheduled rideshare trip information may be stored in the trip table 434. Referring to FIG. 5 is illustrated an exemplary flow of an exemplary process for ridesharing in transportation, in accordance with an embodiment of the present invention. FIG. 5 is a diagram showing services within a sample RFTWS 512. In an exemplary embodiment shown in FIG. 5, the rideshare scheduling service 516 may receive incoming booking requests for rideshare transportation from the controller or other services 514, for example, other ridesharing service providers like Uber®, Lyft® and other like providers). In one embodiment, the rideshare scheduling service 516 may send an incoming request back to a specific controller as shown by the two-way arrow 526. In another embodiment, the rideshare scheduling service 516 may send an incoming request to an On-Demand Rideshare Booking Service 518. This could be an On-Demand Ridesharing Service subsystem internal to the overarching system or external API provided by other ridesharing service providers like Uber®, Lyft® and other like providers. In one embodiment, if the on-demand ride share request is a success then the On Demand Rideshare Booking Service 518 may send a request to the notification service 520. In another embodiment, if the on-demand ride share request is a failure then the On Demand Rideshare Booking Service 518 may send a request to the Ride Retry Module 522. In various embodiments, the notification service 520 may send a number of notifications including but not limited to an SMS, e-mail, phone notification, phone call, or some other like application request. In one embodiment, the ride retry module 522 depending on the current time in relation to the "Scheduled Rideshare Trip Time" may take a decision on whether to request a ride again from the On Demand Rideshare Booking Service 518, or terminate the process by sending a request to the Error Handlers 524, if unable to get a Rideshare Driver to the Scheduled Pickup Location. In one embodiment, the error handler(s) 524 may include, but are not limited to, a "No Driver Available" error handler, a "Prices Outside Acceptable Threshold" error handler, a "No Rideshare Product available" error handler, a "Driver Cancelled" error handler, a "Server Error" error handler, a "Payment Error" error handler, an "Account Error" error handler, and an "Unknown Error" error handler.

Figure 6:
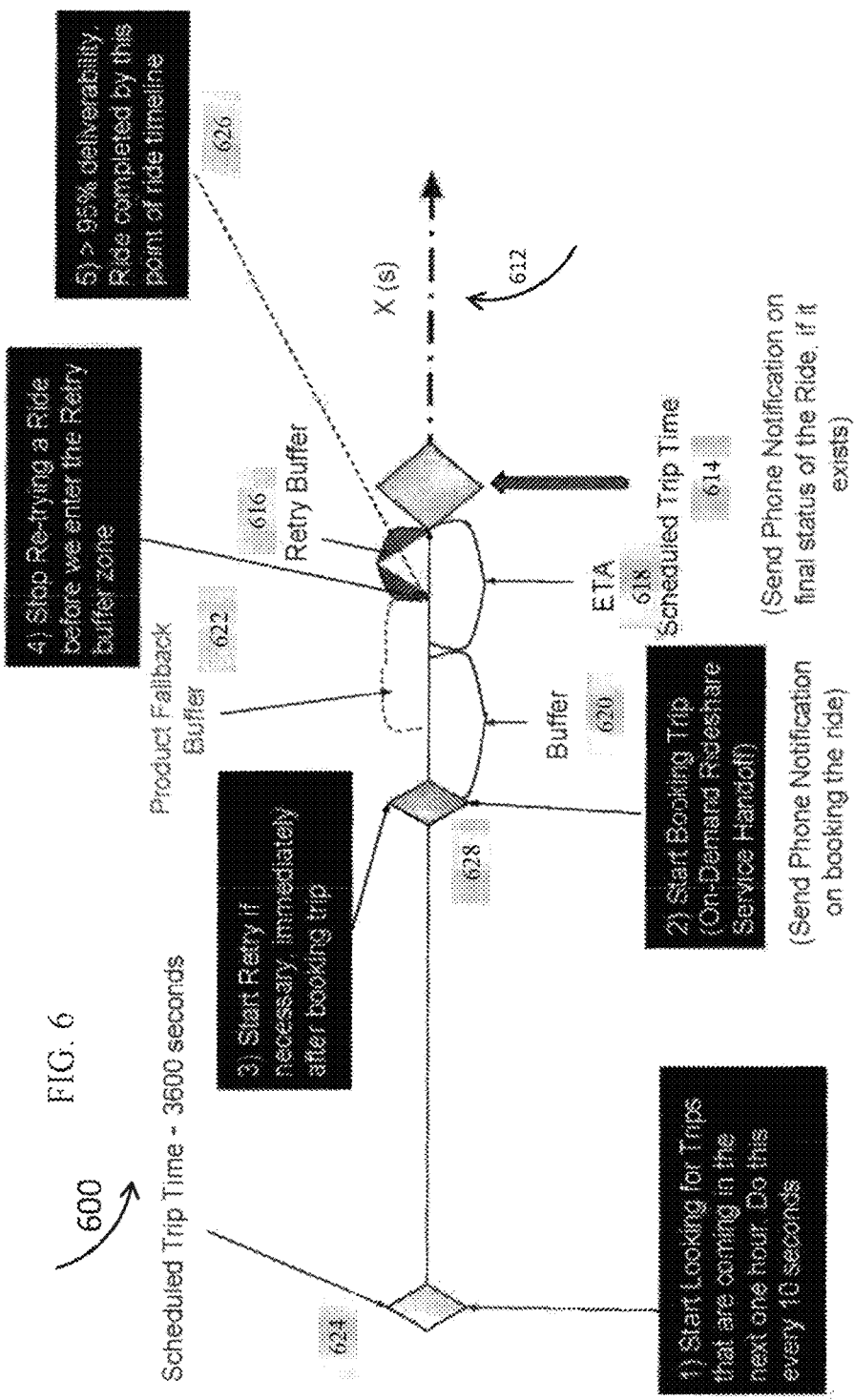
FIG. 6 is a graphical illustration of an exemplary process for ridesharing in transportation, in accordance with an embodiment of the present invention.

Referring to FIG. 6 is provided a graphical illustration of an exemplary process for ridesharing in transportation, in accordance with an embodiment of the present invention. Accordingly, FIG. 6 is a sample implementation 600 of the RFTWS algorithm where the ride is successfully called before the scheduled rideshare trip time. FIG. 6. is a graph where time is represented in seconds on the X-axis 612. Along the X-axis 612 is provided, in an exemplary embodiment, of various stages of a scheduled rideshare ride. The point in time 614 represents the scheduled rideshare trip time. In one embodiment, when the RFTWS works perfectly, even with request failures, the Scheduled Rideshare Trip may start on or around (before or after) the point in time 614. The window in time 616 i.e., the retry buffer may represent the time during which the RFTWS may stop any rideshare ride retries. During this period, a notification or other action may be sent on behalf of the "rideshare rider" or RFTWS to the "rideshare rider" and/or the "rideshare driver" or another specified recipient. The notification may include, but is not limited to, an SMS, e-mail, phone notification, or a trigger to another application.

The window in time 618 (ETA—Estimated Time of Arrival) may be an estimate of how long it may take for the Rideshare Driver to get to the "Scheduled Pickup Location". The window in time 620 (Buffer) may be an additional window to correct for any underestimations in the ETA (Estimated Time of Arrival) 618. In one embodiment, the buffer time 620 may improve the odds of the rideshare driver arriving on time, or at least before the scheduled rideshare trip time.

In one embodiment, an additional buffer window may be provided. The window in time 622 (Product Fallback Buffer) may be an additional window during which the RFTWS attempts rideshare retries using alternative "On-Demand Rideshare Services" or alternate "On-Demand Rideshare Products". In one embodiment, outside the Product Fallback Buffer 622 window a best effort is made at delivering the originally scheduled On-Demand Rideshare Product. The point in time 624 represents the point in time where the RFTWS may start monitoring a specific scheduled rideshare trip. The point in time 624 may also be the point in time where the RFTWS may start looking for trips that may be scheduled to start within the next one hour and this may be repeated at an interval of 10 seconds. The point in time 626 represents the latest time the On-Demand Ride request may be made: the "rideshare driver" may be on the way to the "scheduled pickup location" or may be already at the "scheduled pickup location" at this point. In one exemplary embodiment, greater than about 95 percent of the rides are delivered by the point in time 626. The point in time 628 i.e., the point at the end of the buffer time 620 is when the RFTWS may start booking a trip i.e., on-demand ride sharing handoff and send phone notification on booking the ride to the rideshare user. The point in time 628 i.e., the point at the end of the buffer time 620 is also the time when the RFTWS may start retrying if a failure happens immediately after booking the trip and send phone notification on booking the ride to the rideshare user. For example, in a sample configured setting, the buffer time=2.5 minutes, the Retry buffer=1 minute, the max driver cancellations=3, the product fall back buffer=2 minutes, the product fall back list={array}, and other sample settings include rideshare service ETA=variable. In the exemplary embodiment provided in FIG. 6 (i) On initial attempt at retrying, a notification may be sent to the rideshare user; (ii) If unable to get a ride, a notification may be sent to the ride share user (iii) the retry mechanism & Product Fall back buffer may be measured relative to the (Scheduled trip time) (iv) the ReTry buffer just identifies where re-trying a ride may be stopped, if there are issues; (v) The Product Fallback specifies, when another rideshare product may be tried, if the rideshare user gives permission to do so.

Figure 7:
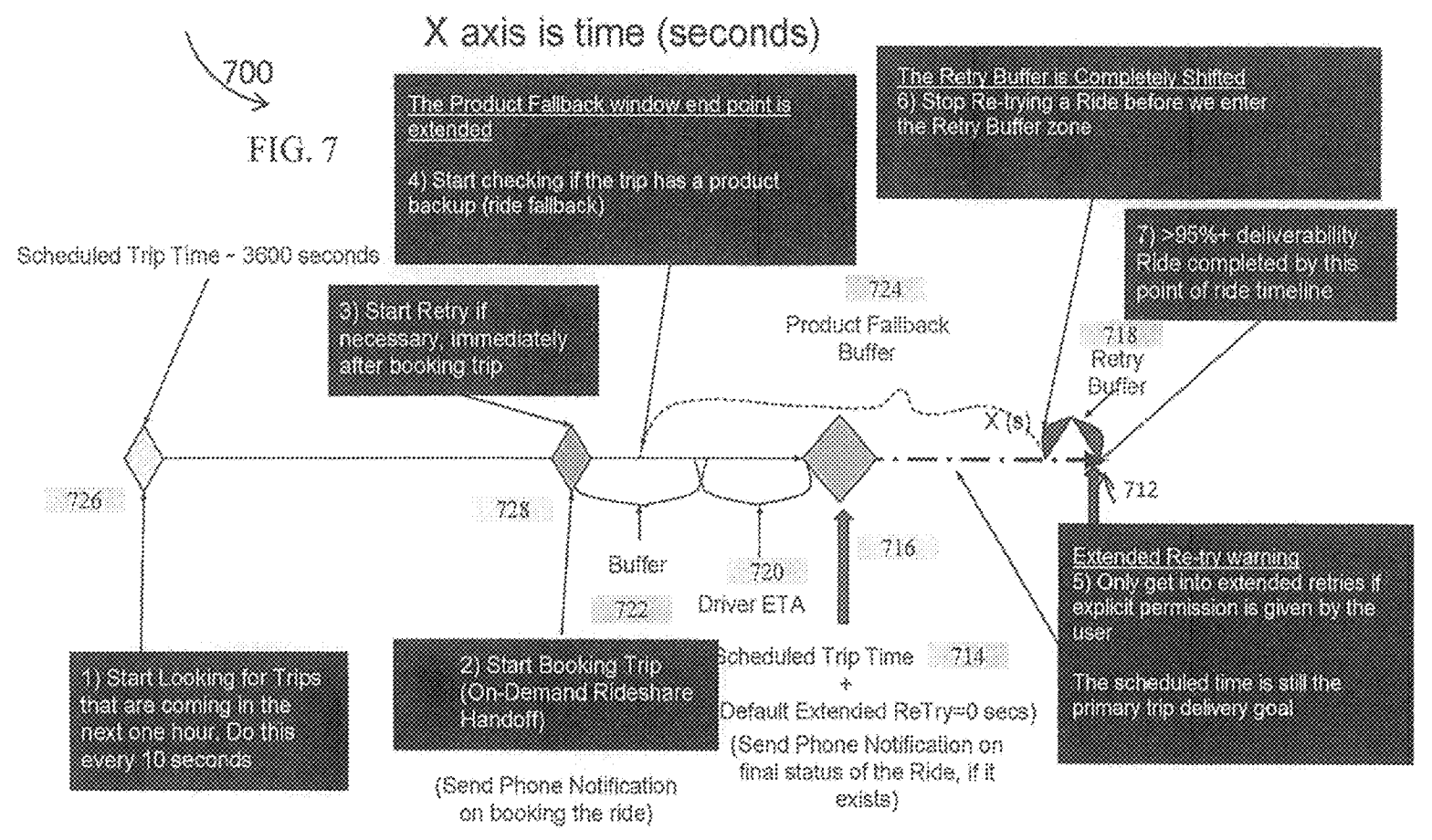

Referring to FIG. 7 is provided a graphical illustration of an exemplary process for ridesharing in transportation, in accordance with an embodiment of the present invention. In one exemplary embodiment 700, FIG. 7 is an implementation of the RFTWS algorithm where the ride is successfully called but minutes after the scheduled rideshare trip time i.e., extended retry scenario). In FIG. 7. is a graph where time is represented in seconds on the X-axis 712. Along the X-axis 712 is provided, in an exemplary embodiment, of various stages of a scheduled rideshare ride. The point in time 714 represents the scheduled rideshare trip time. In one embodiment, if the RFTWS works perfectly, even with request failures, the Scheduled Rideshare Trip will start on or around (before or after) the point in time 716. The window in time 718 may represent the time during which the RFTWS may stops any rideshare ride retries. During this period, a notification or other action is sent on behalf of the "Rideshare Rider" or RFTWS. The window in time 720 (ETA—Estimated Time of Arrival) may be an estimate of how long it may take for the Rideshare Driver to get to the "Scheduled Pickup Location". The window in time 722 (Buffer) is an additional window to correct for any underestimations in the ETA (Estimated Time of Arrival) 720. In one embodiment, the buffer time 720 may improve the odds of the rideshare driver arriving on time, or at least before the scheduled rideshare trip time. The window in time 724 (Product Fallback Buffer) may be an additional window, during which the RFTWS may attempt rideshare retries using alternative "On-Demand Rideshare Services" or alternate "On-Demand Rideshare Products". Outside the Product Fallback Buffer 724 window a best effort is made at delivering the originally scheduled On-Demand Rideshare Product. The point in time 726 represents the point in time where the RFTWS starts monitoring a specific scheduled rideshare trip. Any point in time at or after 716 represents the latest time the scheduled rideshare trip may start i.e., the "Rideshare Driver" may be on the way to the "Scheduled Pickup Location" or already at the "Scheduled Pickup Location". The point in time 728 i.e., the point at the end of the buffer time 722 is when the RFTWS may start booking a trip i.e., on-demand ride sharing handoff and send phone notification on booking the ride to the rideshare user. The point in time 728 i.e., the point at the end of the buffer time 722 is also the time when the RFTWS may start retrying if necessary, immediately after booking the trip and if immediately unable to book a trip and send phone notification on booking the ride to the rideshare user. For example, in a sample configured setting, the buffer time=2.5 minutes, the Retry buffer=1 minute, the max driver cancellations=3, extended retry=15 minutes, the product fall back buffer=2 minutes, the product fall back list={array}, and other sample settings include rideshare service ETA=variable. In the exemplary embodiment provided in FIG. 7 (i) On initial attempt at Retrying, a notification may be sent to the rideshare user; (ii) If unable to get a ride, a notification may be sent to the ride share user; (iii) the retry Buffer and Product Fallback buffer logic are the only things impacted by the extended re-try mechanism; (iv) the ReTry buffer just identifies where re-trying a ride is stopped, if there are issues; (v) the extended re-try just specifies how far back the entire ReTry Buffer, may be pushed if necessary; (vi) the product fallback specifies, when a secondary product may be tried, if the rideshare user gives permission to do so (vii) the start point of the Product Fallback window is defined as Scheduled Time−(Retry Buffer+Product Buffer).

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method or steps described in the present application that can be carried out on a computing machine, a typical computer system can, when appropriately configured or designed, serve as a system in which those aspects of the invention may be embodied.

Figure 8B:
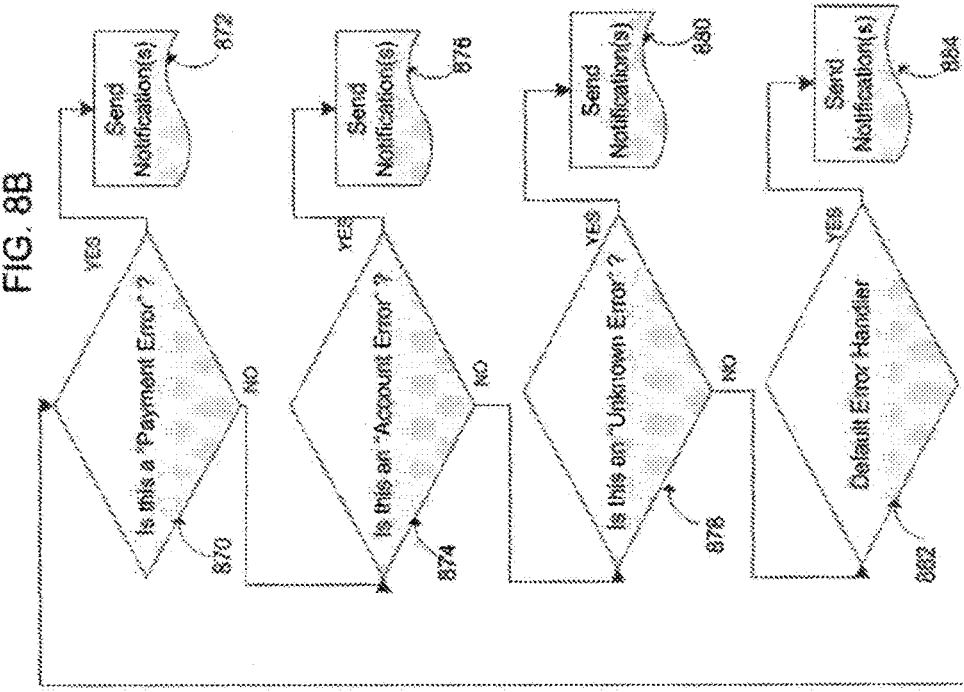
Figure 8B:
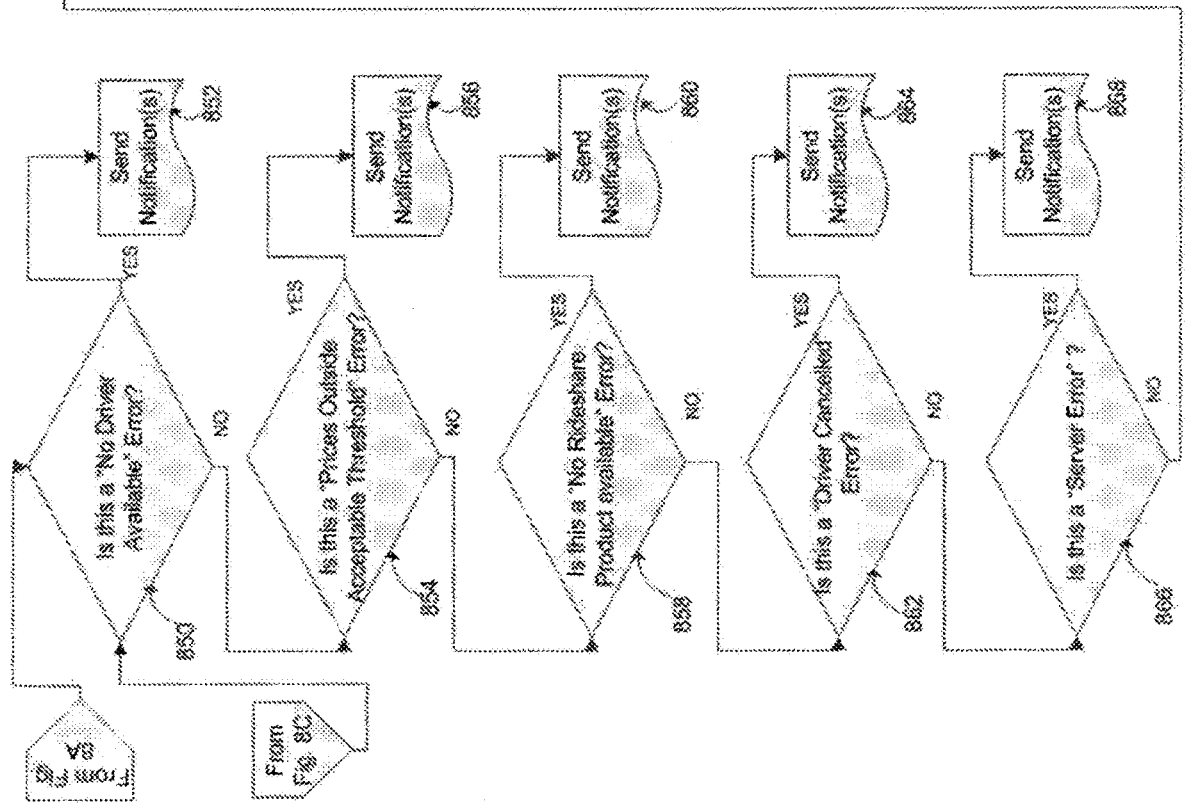

Referring to FIGS. 8A-8C is provided a flow chart of an exemplary process for ridesharing in transportation, in accordance with an embodiment of the present invention. Accordingly, FIG. 8A is a sample implementation 800 of the RFTWS designated software program where at the start of the process is a step 802 the rideshare rider requests a ride. In a step 804 the requested ride is saved as a "scheduled rideshare trip" in a database 806. In step 808 a cron job may check the database 806 every "X" seconds (for example, in one exemplary embodiment X is 1 second); and for upcoming trips in the next "Y" hours (for example, in one exemplary embodiment Y is 2 hours). In a step 808 if a trip is coming up in the next 2 hours, the RFTWS designated software program may monitor the trip's ETA (estimated time of arrival). If "YES" 810, i.e., if the scheduled rideshare trip time is greater than the total of the current time, the ETA, and the buffer, then in step 812 the ETA of the trip is updated in the database 806. If "NO" 810, then in step 814 a decision may be made based on if the scheduled rideshare trip time is equal to or less than the total of the current time; the ETA, and the buffer. If "YES" 814, another decision is made in step 816, to check if the current time is within the product fallback buffer (window). If "YES" 816, then in step 818 the on-demand rideshare booking service may attempt to book the ride with a secondary or primary on-demand rideshare product and then move on to step 822. If "NO" 816, then in step 820 the on-demand rideshare booking service may attempt to book the ride with the primary on-demand rideshare product and then move on to step 822. Accordingly, once the scheduled trip time is equal to the sum of current time, ETA and Buffer a request may be made to the "On-Demand Rideshare Booking Service" 818 or 820. It may be appreciated by a person with ordinary skill in the art, in light of and in accordance with the teachings of the present invention, that the buffer may be an additional window to correct for any underestimations in the ETA. In step 822 a decision may be made based on if the scheduled rideshare trip is booked successfully by checking with a trip monitor in step 823. If "NO" 822, in step 828 a decision may be made based on if the current time is less than the difference of the scheduled time and the retry buffer. If "YES" 828, then a decision may be made in step 848 based on if current numbers of drivers' cancelled is less than or equal to maximum driver cancelled errors. If "YES" 848, the process loops back to step 816. If the decision from step 822 is "NO" (828), and the decision form step 828 is "NO" (See FIG. 8C), the process moves on to step 830, where if the RFTWS does not have extended retry permissions (i.e decision in 830 is NO), the requests are sent to the error handler. On the other hand, if the decision from step 822 (See FIG. 8A) is a "YES" 823, i.e. if the scheduled rideshare trip booked successfully as checked with a trip monitor in step 823, then in a step 824 a decision is made to check if the scheduled rideshare trip is completed successfully. If "YES" 824, a completion notification may be sent to relevant notification subscribers, for example, the rider and the RFTWS. If "NO" 824, the process loops back to step 828. In step 830 (FIG. 8C), it may be determined if the RFTWS has an extended retry permission. if "NO" 830, then the process moves on to step 844, i.e., the sent to error handler step. If the RFTWS has an extended retry permission, i.e., "YES" 830, the process moves on to another decision making step 832. In step 832, a decision may be made to check if the current numbers of drivers cancelled is less than or equal to the maximum number of drivers cancelled errors. If it is a "YES" 832, the process moves on to step 834. In step 834 a decision is made to determine whether the current time is within the extended product fallback buffer window. If "YES" 834 the process moves on to step 838 where the on-demand rideshare booking service attempts to book a ride with a secondary or a primary on-demand rideshare product. If "NO" 834 the process moves on to step 836 where the on-demand rideshare booking service attempts to book a ride with a primary on-demand rideshare product. The process moves on to step 840 from both steps 836 and 838 to check if the Scheduled rideshare trip was booked successfully. If "YES" 840 the process loops back to step 824 (in FIG. 8A). If "NO" 840, the process moves on to step 842 (in FIG. 8C). In step 842 it is again checked if the current time is less than the difference between the retry buffer and a sum total of the scheduled time and the extended retry time. If it is a "NO" 842 then the process moves on to step 844, i.e., sent to error handler (see FIG. 8B for the error handler). If it is a "YES" 842 the process moves back to step 832. Accordingly, if the "On-Demand Rideshare Booking Service" 836 or 838 is unable to book the ride successfully a re-try attempt is made if the Current time is before the start of the ReTry Buffer 842. In FIG. 8A, it may be appreciated by a person with ordinary skill in the art, in light of and in accordance with the teachings of the present invention, that the Retry buffer just identifies where re-trying a ride is stopped, if there are issues. In addition to the afore-mentioned, a check is also made to determine if the maximum number of driver cancelled errors has not been exceeded 848. If the previously mentioned checks 828 and 848 pass, i.e., if it is a "YES", then a request to the "On-Demand Rideshare Booking Service" 818 and 820 may be made once again. Repeated ReTries are attempted as long as the criteria in 828 and 848 are met. If criterion 828 fails or criterion 848 fails whilst the RFTWS does NOT have extended retry permissions 830 (See FIG. 8C), the appropriate error handler 844 (Also see FIG. 8B) may be triggered i.e., "No Driver Available" 850, "Prices Outside Acceptable Threshold 854, "No Rideshare Product available" 858, "Driver Cancelled" 862, "Server Error" 866, "Payment Error" 870, "Account Error" 874, "Unknown Error" 878, and default error handler 882 i.e., not exclusive to the afore-mentioned reasons or scenarios. In the event that criterion 828 fails (in FIG. 8A), and the RFTWS has extended Retry permissions 830, then the RFTWS may continue to re-try up to about "Z" minutes, for example, Z is 30 minutes, after the "scheduled rideshare trip" time. The check is done to determine if the RFTWS has extended retry permissions. For example, where the configured maximum number of acceptable Driver Requests is DR, in one exemplary embodiment; "Number of DC failures"<(3*DR) or "Number of DC failures"=(3*DR) for the RFTWS is a sample condition outside which we stop re-trying on-demand ride requests, if the configured maximum number of driver requests is greater than 3. If the RFTWS has the required extended ReTry permissions we make a request to the "On-Demand Rideshare Booking Service" 836 or 838 (See FIG. 8C). If the "On-Demand Rideshare Booking Service" 836 or 838 is unable to book the ride successfully, a re-try attempt is made if the Current time is before the start of the New ReTry Buffer 842 (calculated by the following equation: Scheduled Time+Extended Retry Time—Retry-Buffer) and if the maximum number of driver cancelled errors has not been exceeded 832. Repeated ReTries are attempted as long as the criteria in 832 and 842 are met. If either criteria fails (832 or 842), the appropriate error handler 844 may be triggered (See FIG. 8B) i.e., "No Driver Available" 850, "Prices Outside Acceptable Threshold 854, "No Rideshare Product available" 858, "Driver Cancelled" 862, "Server Error" 866, "Payment Error" 870, "Account Error" 874, "Unknown Error" 878, and default error handler 882 i.e., not exclusive to the afore-mentioned reasons or scenarios. The error handlers follow a flow of checks and notifications. i.e., if "No Driver Available" 850 check results in a "YES" 850, then a notification 852 may be sent to the rider and RFTWS and if check results in a "NO" 850 then the error handler 854 may move on to the check the next possible error i.e., if "Prices Outside Acceptable Threshold 854 check results in a "YES" 854, then a notification 856 may be sent to the rider and RFTWS and if check results in a "NO" 854 then the error handler 858 may move on to the check the next possible error i.e., if "No Rideshare Product available" 858 check results in a "YES" 858, then a notification 860 may be sent to the rider and RFTWS and if check results in a "NO" 858 then the error handler 862 may move on to the check the next possible error i.e., if "Driver Cancelled" 862 check results in a "YES" 862, then a notification 864 may be sent to the rider and RFTWS and if check results in a "NO" 862 then the error handler 866 may move on to the check the next possible error i.e., if "Server Error" 866 check results in a "YES" 866, then a notification 868 may be sent to the rider and RFTWS and if check results in a "NO" 866 then the error handler 870 may move on to the check the next possible error i.e., if "Payment Error" 870 check results in a "YES" 870, then a notification 872 may be sent to the rider and RFTWS and if check results in a "NO" 870 then the error handler 874 may move on to the check the next possible error i.e., if "Account Error" 874 check results in a "YES" 874, then a notification 876 may be sent to the rider and RFTWS and if check results in a "NO" 874 then the error handler 878 may move on to the check the next possible error i.e., if "Unknown Error" 878 check results in a "YES" 878, then a notification 880 may be sent to the rider and RFTWS and if check results in a "NO" 878 then the error handler 882 may move on to the check the next possible error i.e., if default error handler 882 i.e., not exclusive to the afore-mentioned reasons or scenarios check results in a "YES" 882, then a notification 884 may be sent to the rider and RFTWS.

Figure 9:
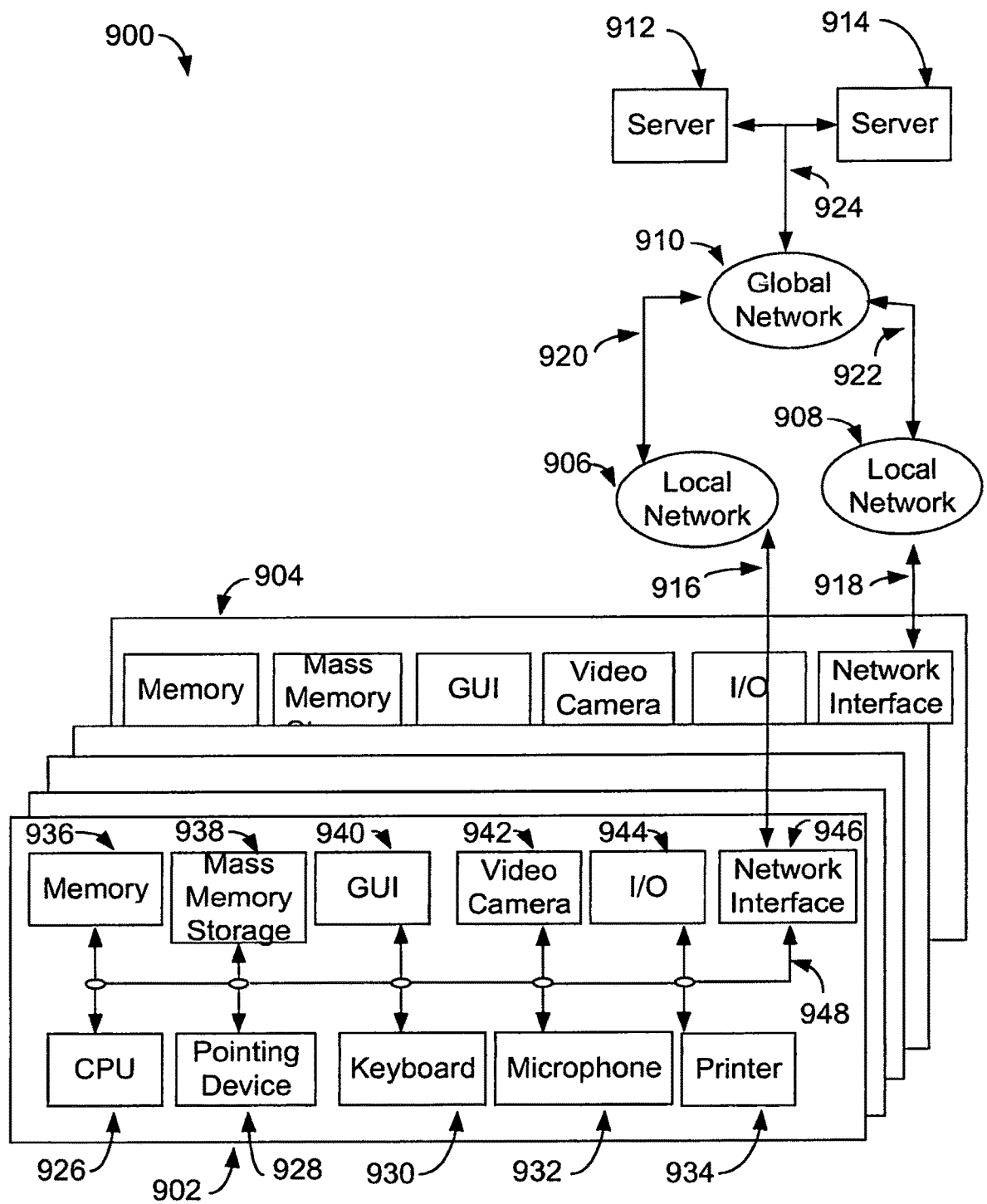
FIG. 9 is a block diagram depicting an exemplary client/server system which may be used by an exemplary web-enabled/networked embodiment of the present invention.

FIG. 9 is a block diagram depicting an exemplary client/server system which may be used by an exemplary web-enabled/networked embodiment of the present invention.

A communication system 900 includes a multiplicity of clients with a sampling of clients denoted as a client 902 and a client 904, a multiplicity of local networks with a sampling of networks denoted as a local network 906 and a local network 908, a global network 910 and a multiplicity of servers with a sampling of servers denoted as a server 912 and a server 914.

Client 902 may communicate bi-directionally with local network 906 via a communication channel 916. Client 904 may communicate bi-directionally with local network 908 via a communication channel 918. Local network 906 may communicate bi-directionally with global network 910 via a communication channel 920. Local network 908 may communicate bi-directionally with global network 910 via a communication channel 922. Global network 910 may communicate bi-directionally with server 912 and server 914 via a communication channel 924. Server 912 and server 914 may communicate bi-directionally with each other via communication channel 924. Furthermore, clients 902, 904, local networks 906, 908, global network 910 and servers 912, 914 may each communicate bi-directionally with each other.

In one embodiment, global network 910 may operate as the Internet. It will be understood by those skilled in the art that communication system 900 may take many different forms. Non-limiting examples of forms for communication system 900 include local area networks (LANs), wide area networks (WANs), wired telephone networks, wireless networks, or any other network supporting data communication between respective entities.

Clients 902 and 904 may take many different forms. Non-limiting examples of clients 902 and 904 include personal computers, personal digital assistants (PDAs), cellular phones and smartphones.

Client 902 includes a CPU 926, a pointing device 928, a keyboard 930, a microphone 932, a printer 934, a memory 936, a mass memory storage 938, a GUI 940, a video camera 942, an input/output interface 944, and a network interface 946.

CPU 926, pointing device 928, keyboard 930, microphone 932, printer 934, memory 936, mass memory storage 938, GUI 940, video camera 982, input/output interface 944 and network interface 946 may communicate in a unidirectional manner or a bi-directional manner with each other via a communication channel 948. Communication channel 948 may be configured as a single communication channel or a multiplicity of communication channels.

CPU 926 may be comprised of a single processor or multiple processors. CPU 926 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 936 is used typically to transfer data and instructions to CPU 926 in a bi-directional manner. Memory 936, as discussed previously, may include any suitable computer-readable media, intended for data storage, such as those described above excluding any wired or wireless transmissions unless specifically noted. Mass memory storage 938 may also be coupled bi-directionally to CPU 926 and provides additional data storage capacity and may include any of the computer-readable media described above. Mass memory storage 938 may be used to store programs, data and the like and is typically a secondary storage medium such as a hard disk. It will be appreciated that the information retained within mass memory storage 938, may, in appropriate cases, be incorporated in standard fashion as part of memory 936 as virtual memory.

CPU 926 may be coupled to GUI 940. GUI 940 enables a user to view the operation of computer operating system and software. CPU 926 may be coupled to pointing device 928. Non-limiting examples of pointing device 928 include computer mouse, trackball and touchpad. Pointing device 928 enables a user with the capability to maneuver a computer cursor about the viewing area of GUI 940 and select areas or features in the viewing area of GUI 940. CPU 926 may be coupled to keyboard 930. Keyboard 930 enables a user with the capability to input alphanumeric textual information to CPU 926. CPU 926 may be coupled to microphone 932. Microphone 932 enables audio produced by a user to be recorded, processed and communicated by CPU 926. CPU 926 may be connected to printer 934. Printer 934 enables a user with the capability to print information to a sheet of paper. CPU 926 may be connected to video camera 942. Video camera 942 enables video produced or captured by user to be recorded, processed and communicated by CPU 926.

CPU 926 may also be coupled to input/output interface 944 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 926 optionally may be coupled to network interface 946 which enables communication with an external device such as a database or a computer or telecommunications or internet network using an external connection shown generally as communication channel 916, which may be implemented as a hardwired or wireless communications link using suitable conventional technologies. With such a connection, CPU 926 might receive information from the network, or might output information to a network in the course of performing the method steps described in the teachings of the present invention.

Figure 10:
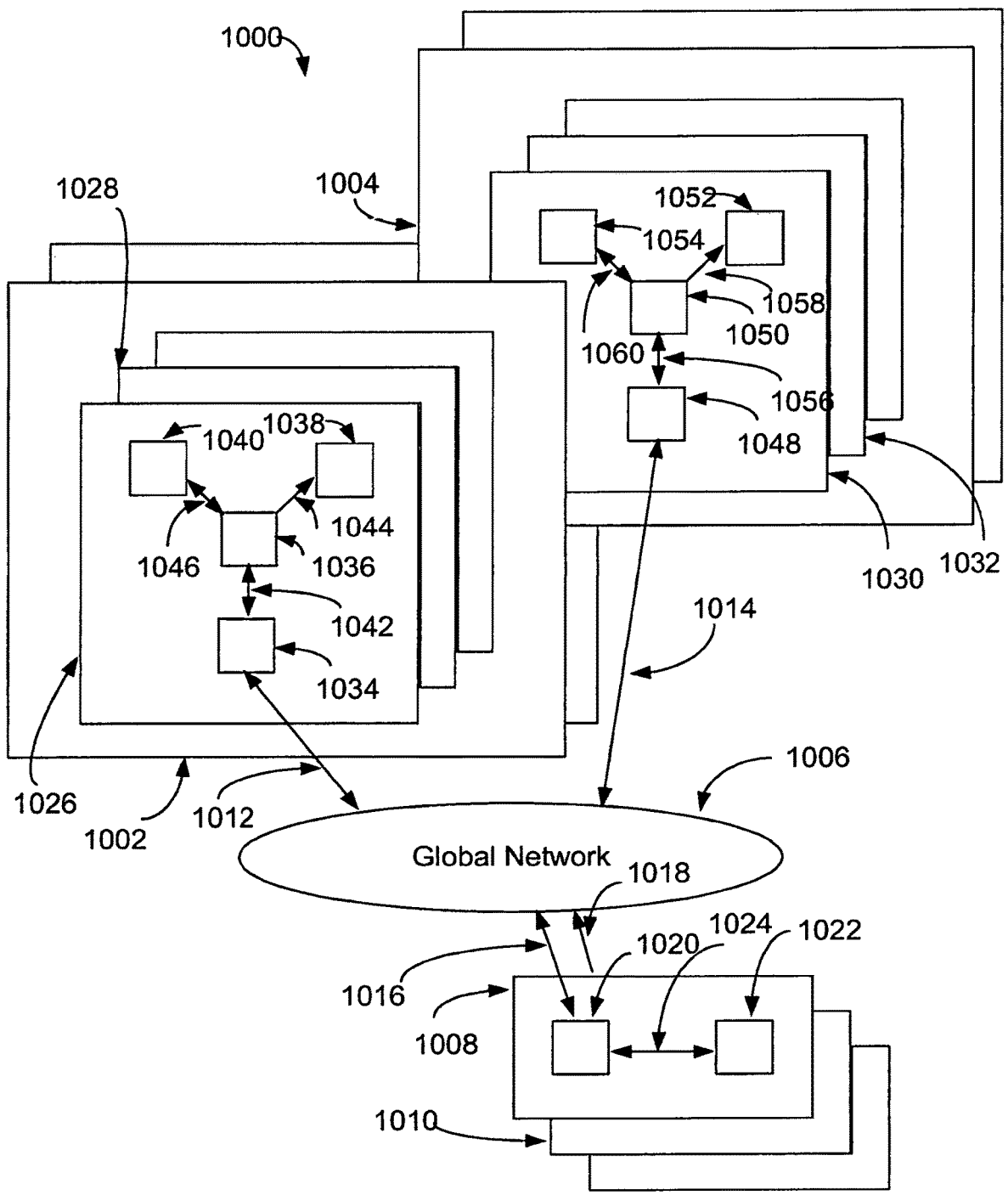
FIG. 10 illustrates a block diagram depicting a conventional client/server communication system Unless otherwise indicated illustrations in the figures are not necessarily drawn to scale.

FIG. 10 illustrates a block diagram depicting a conventional client/server communication system.

A communication system 1000 includes a multiplicity of networked regions with a sampling of regions denoted as a network region 1002 and a network region 1004, a global network 1006 and a multiplicity of servers with a sampling of servers denoted as a server device 1008 and a server device 1010.

Network region 1002 and network region 1004 may operate to represent a network contained within a geographical area or region. Non-limiting examples of representations for the geographical areas for the networked regions may include postal zip codes, telephone area codes, states, counties, cities and countries. Elements within network region 1002 and 1004 may operate to communicate with external elements within other networked regions or within elements contained within the same network region.

In some implementations, global network 1006 may operate as the Internet. It will be understood by those skilled in the art that communication system 1000 may take many different forms. Non-limiting examples of forms for communication system 1000 include local area networks (LANs), wide area networks (WANs), wired telephone networks, cellular telephone networks or any other network supporting data communication between respective entities via hardwired or wireless communication networks. Global network 1006 may operate to transfer information between the various networked elements.

Server device 1008 and server device 1010 may operate to execute software instructions, store information, support database operations and communicate with other networked elements. Non-limiting examples of software and scripting languages which may be executed on server device 1008 and server device 1010 include C, C++, C# and Java.

Network region 1002 may operate to communicate bi-directionally with global network 1006 via a communication channel 1012. Network region 1004 may operate to communicate bi-directionally with global network 1006 via a communication channel 1014. Server device 1008 may operate to communicate bi-directionally with global network 1006 via a communication channel 1016. Server device 1010 may operate to communicate bi-directionally with global network 1006 via a communication channel 1018. Network region 1002 and 1004, global network 1006 and server devices 1008 and 1010 may operate to communicate with each other and with every other networked device located within communication system 1000.

Server device 1008 includes a networking device 1020 and a server 1022. Networking device 1020 may operate to communicate bi-directionally with global network 1006 via communication channel 1016 and with server 1022 via a communication channel 1024. Server 1022 may operate to execute software instructions and store information.

Network region 1002 includes a multiplicity of clients with a sampling denoted as a client 1026 and a client 1028. Client 1026 includes a networking device 1034, a processor 1036, a GUI 1038 and an interface device 1040. Non-limiting examples of devices for GUI 1038 include monitors, televisions, cellular telephones, smartphones and PDAs (Personal Digital Assistants). Non-limiting examples of interface device 1040 include pointing device, mouse, trackball, scanner and printer. Networking device 1034 may communicate bi-directionally with global network 1006 via communication channel 1012 and with processor 1036 via a communication channel 1042. GUI 1038 may receive information from processor 1036 via a communication channel 1044 for presentation to a user for viewing. Interface device 1040 may operate to send control information to processor 1036 and to receive information from processor 1036 via a communication channel 1046. Network region 1004 includes a multiplicity of clients with a sampling denoted as a client 1030 and a client 1032. Client 1030 includes a networking device 1048, a processor 1050, a GUI 1052 and an interface device 1054. Non-limiting examples of devices for GUI 1038 include monitors, televisions, cellular telephones, smartphones and PDAs (Personal Digital Assistants). Non-limiting examples of interface device 1040 include pointing devices, mousse, trackballs, scanners and printers. Networking device 1048 may communicate bi-directionally with global network 1006 via communication channel 1014 and with processor 1050 via a communication channel 1056. GUI 1052 may receive information from processor 1050 via a communication channel 1058 for presentation to a user for viewing. Interface device 1054 may operate to send control information to processor 1050 and to receive information from processor 1050 via a communication channel 1060.

For example, consider the case where a user interfacing with client 1026 may want to execute a networked application. A user may enter the IP (Internet Protocol) address for the networked application using interface device 1040. The IP address information may be communicated to processor 1036 via communication channel 1046. Processor 1036 may then communicate the IP address information to networking device 1034 via communication channel 1042. Networking device 1034 may then communicate the IP address information to global network 1006 via communication channel 1012. Global network 1006 may then communicate the IP address information to networking device 1020 of server device 1008 via communication channel 1016. Networking device 1020 may then communicate the IP address information to server 1022 via communication channel 1024. Server 1022 may receive the IP address information and after processing the IP address information may communicate return information to networking device 1020 via communication channel 1024. Networking device 1020 may communicate the return information to global network 1006 via communication channel 1016. Global network 1006 may communicate the return information to networking device 1034 via communication channel 1012. Networking device 1034 may communicate the return information to processor 1036 via communication channel 1042. Processor 1046 may communicate the return information to GUI 1038 via communication channel 1044. User may then view the return information on GUI 1038.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC § 112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC § 112 (6). In some embodiments, the methods and/or system components which may be located and/or performed remotely include, without limitation: The On-Demand Rideshare Service(s) on which the RFTWS system is reliant.

It is noted that according to USA law, all claims must be set forth as a coherent, cooperating set of limitations that work in functional combination to achieve a useful result as a whole. Accordingly, for any claim having functional limitations interpreted under 35 USC § 112 (6) where the embodiment in question is implemented as a client-server system with a remote server located outside of the USA, each such recited function is intended to mean the function of combining, in a logical manner, the information of that claim limitation with, at least one other limitation of the claim. For example, in client-server systems where certain information claimed under 35 USC § 112 (6) is/(are) dependent on one or more remote servers located outside the USA, it is intended that each such recited function under 35 USC § 112 (6) is to be interpreted as the function of the local system receiving the remotely generated information required by a locally implemented claim limitation, wherein the structures and or steps which enable, and breath life into the expression of such functions claimed under 35 USC § 112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC § 112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate al such functionally corresponding structures and related enabling material herein by reference for the purpose of providing explicit structures that implement the functional means claimed. Applicant(s) request(s) that fact finders during any claims construction proceedings and/or examination of patent allow ability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing of ride sharing in transportation according to the present invention will be apparent to those skilled in the art. Various aspects of the invention have been described above by way of illustration, and the specific embodiments disclosed are not intended to limit the invention to the particular forms disclosed. The particular implementation of the ride sharing in transportation may vary depending upon the particular context or application. By way of example, and not limitation, the ride sharing in transportation described in the foregoing were principally directed to ridesharing services implementations; however, similar techniques may instead be applied to mobility services, and other transportation services etc . . . , which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

What is claimed is:

1. A system, comprising:
    a computing system including a processor configured to:
       receive, from a network device, a request for a ride at a scheduled time;
       without user intervention, start to look for a candidate ride, to serve the received request, at a predetermined time prior to the scheduled time;
       without user intervention, book the candidate ride to serve the received request upon determining that the candidate ride can serve the received request;
       determine occurrence of a potential failure associated with the candidate ride serving the received request; and
       without user intervention, book a replacement ride to serve the received request upon determining that the replacement ride can serve the received request.

2. The system of claim 1, wherein the predetermined time is based on stored data associated with previously received requests that were successfully served and/or with previously received requests that were not successfully served.

3. The system of claim 1, wherein the processor determines an estimated time of arrival associated with the candidate ride or the replacement ride serving the received request.

4. The system of claim 1, wherein the processor determines the occurrence of the potential failure when the processor determines that the candidate ride cannot serve the received request.

5. The system of claim 1, wherein the processor transmits, to the network device, identification information associated with the candidate ride based on booking the candidate ride.

6. A method performed by a processor executing instructions in association with a tangible memory, the method comprising:
    receiving, from a network device, a request for a ride at a scheduled time;
    without user intervention, starting to look for a candidate ride, to serve the received request, at a predetermined time prior to the scheduled tine;
    without user intervention, booking the candidate ride to serve the received request upon determining that the candidate ride can serve the received request;
    determining occurrence of a potential failure associated with the candidate ride serving the received request; and
    without user intervention, booking a replacement ride to serve the received request upon determining that the replacement ride can serve the received request.

7. The method of claim 6, wherein the starting to look for the candidate ride includes determining the predetermined time based on stored data associated with previously received requests that were successfully served and/or with previously received requests that were not successfully served.

8. The method of claim 6, further comprising:
    determining an estimated time of arrival associated with the candidate ride or the replacement ride serving the received request.

9. The method of claim 6, wherein the determining the occurrence of the potential failure includes determining that the candidate ride cannot serve the received request.

10. The method of claim 6, further comprising:
    transmitting, to the network device, identification information associated with the candidate ride based on booking the candidate ride.

11. A non-transitory computer-readable storage medium with executable instructions stored thereon, the executable instructions causing a processor to perform a method, comprising:
    receiving, from a network device, a request for a ride at a scheduled time;
    without user intervention, starting to look for a candidate ride, to serve the received request, at a predetermined time prior to the scheduled time;
    without user intervention, booking the candidate ride to serve the received request upon determining that the candidate ride can serve the received request;
    determining occurrence of a potential failure associated with the candidate ride serving the received request; and
    booking the replacement ride to serve the received request without user intervention upon determining that the replacement ride can serve the received request.

12. The method of claim 11, wherein the starting to look for the candidate ride includes determining the predetermined time based on stored data associated with previously received requests that were successfully served and/or with previously received requests that were not successfully served.

13. The method of claim 11, further comprising:
determining an estimated time of arrival associated with the candidate ride or the replacement ride serving the received request.

14. The method of claim 11, wherein the determining the occurrence of the potential failure includes determining that the candidate ride cannot serve the received request.

15. The method of claim 11, further comprising:
transmitting, to the network device, identification information associated with the candidate ride based on booking the candidate ride.

* * * * *